Dec. 5, 1961     R. H. D. CHAMBERLIN ET AL     3,011,560
APPARATUS FOR METERING THE FUEL SUPPLIED TO A PRIME MOVER
Filed Aug. 29, 1958     2 Sheets-Sheet 1

INVENTORS.
REGINALD H.D. CHAMBERLIN
JOHN SKELLERN
BY
Watson, Cole, Grindle & Watson
ATTORNEY Dec. 5, 1961  R. H. D. CHAMBERLIN ET AL  3,011,560
APPARATUS FOR METERING THE FUEL SUPPLIED TO A PRIME MOVER
Filed Aug. 29, 1958  2 Sheets-Sheet 2

FIG. I. (B)

INVENTORS
REGINALD H.D. CHAMBERLIN
JOHN SKELLERN
BY
Watson, Cole, Grindle & Watson
ATTORNEY.

United States Patent Office 3,011,560
Patented Dec. 5, 1961

3,011,560
APPARATUS FOR METERING THE FUEL
SUPPLIED TO A PRIME MOVER
Reginald Henry Douglas Chamberlin, Ealing, London, and John Skellern, Northolt, England, assignors to D. Napier & Son Limited, London, England, a company of Great Britain
Filed Aug. 29, 1958, Ser. No. 757,947
Claims priority, application Great Britain Dec. 14, 1954
1 Claim. (Cl. 170—135.74)

This invention relates to apparatus for metering the fuel supplied to a propulsion power unit of the type which comprises a compressor delivering air to one or more combustion chambers wherein the fuel is burnt the products of combustion from these chambers flowing to and acting on a turbine the rotor of which drives the rotor of the compressor and also drives a propeller the pitch of whose blades can be automatically adjusted by a governor to control the speed of the power unit, and is concerned with an improvement in apparatus of the above type and of the kind comprising in combination a metering orifice the dimensions of which in directions at right angles are determined by two relatively movable metering orifice members, a pump which delivers fuel from a reservoir to this metering orifice and is driven by the turbine, means for moving and setting in relation to the metering orifice one of the said metering orifice members which determine the dimensions of this orifice, the movements of this member (hereinafter termed the temperature-responsive metering orifice valve) being controlled by a temperature-responsive member in accordance with the temperature in the inlet or at some selected point in the compressor (hereinafter for convenience referred to as the compressor inlet temperature), a main control member arranged simultaneously to cause movement of the second of the said two metering orifice members (hereinafter for convenience called the manually controlled metering orifice member) and to control the setting of the propeller governor and thereby control the speed of the power unit, whereby for each setting of the manually controlled metering orifice member there is a predetermined corresponding speed setting, and a metering pressure control unit which controls the pressure drop across the metering orifice. One form of such apparatus is described in the specification of United States Patent No. 2,474,033 and the present invention is particularly but not exclusively applicable to apparatus of the kind forming the subject of that patent.

This application is a continuation-in-part of our prior application, Serial No. 551,620, filed December 7, 1955, now abandoned.

For convenience the rotors of the turbine and compressor, which are usually directly connected to one another, will herein be referred to as the rotor while the rotational speed of the rotor of a power unit of the kind referred to will be referred to herein as "engine speed."

In apparatus of the kind referred to for metering the fuel supplied to a power unit of the type referred to, the mechanism by which the manually controlled metering orifice member and the propeller governor are controlled is such that, provided that at sea level or at any altitude I.C.A.N. conditions exist, the power unit will operate approximately upon its "operating curve," that is to say the theoretical curve relating mass airflow through the power unit to the compression ratio in the compressor which has been established by calculation and test as providing substantially maximum efficiency while maintaining the operating conditions sufficiently removed from the "surge curve" to ensure that surge conditions will not arise due to such departures from the "operating curve" as may be unavoidable and expected in actual operation.

With existing apparatus of the kind referred to, while control mechanism responsive to atmospheric conditions has been provided such that, provided I.C.A.N. conditions exist, the power unit will follow its "operating curve" within reasonable limits, in practice there may be substantial departures from I.C.A.N. conditions with the result that it has been necessary to establish the operating curve along a line substantially displaced from the surge curve in order to be sure that surge conditions will not occur when the power unit encounters conditions which depart from I.C.A.N. conditions to the maximum degree which may be expected.

The object of the present invention is to provide apparatus of the kind referred to in which the operation of the power unit will be more satisfactorily controlled in such a manner as to enable the unit to operate with approximately maximum efficiency under all conditions without risk of surge and to give the pilot of an aircraft incorporating the unit a higher degree of freedom in the operation of the main control member of the unit than he has hitherto enjoyed.

The form of apparatus according to the invention may vary considerably but one form of such apparatus is shown in the acompanying drawings in which.

Figure 1:
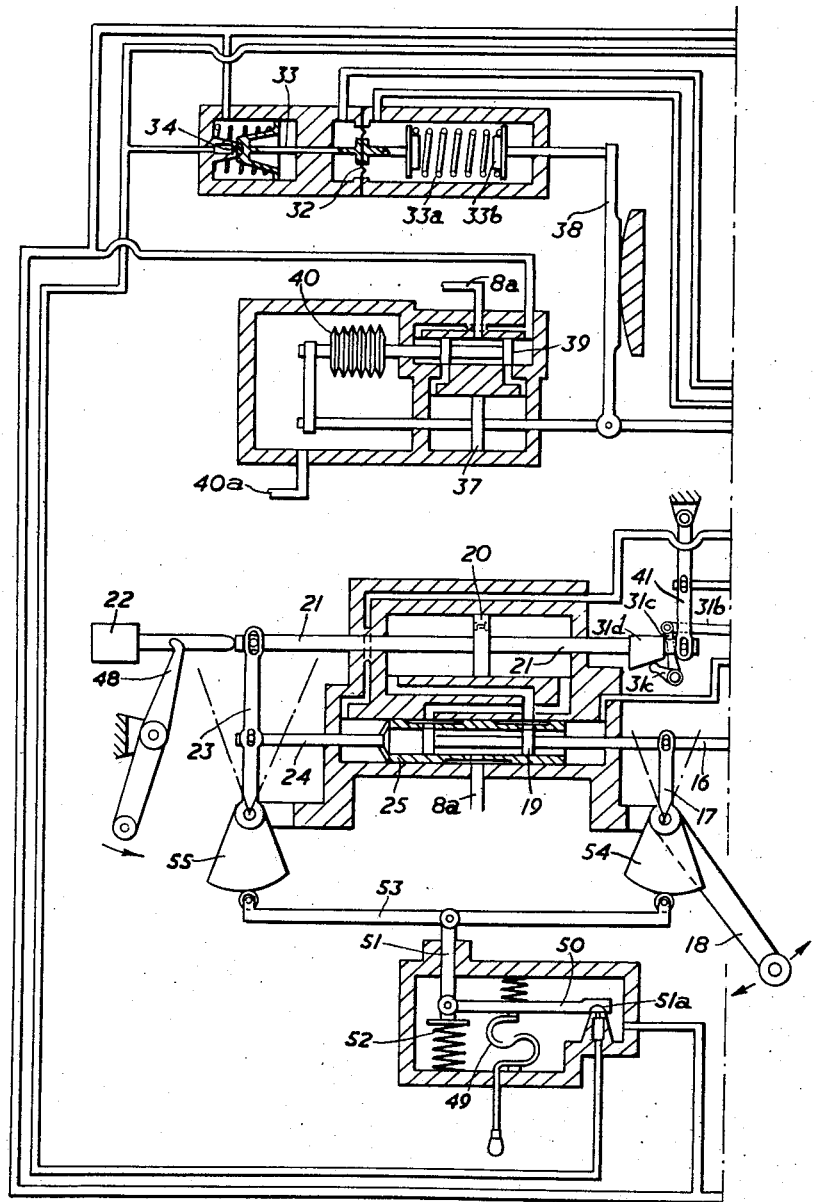
FIGURE 1 is a diagrammatic arrangement of the apparatus.
Figure 2:
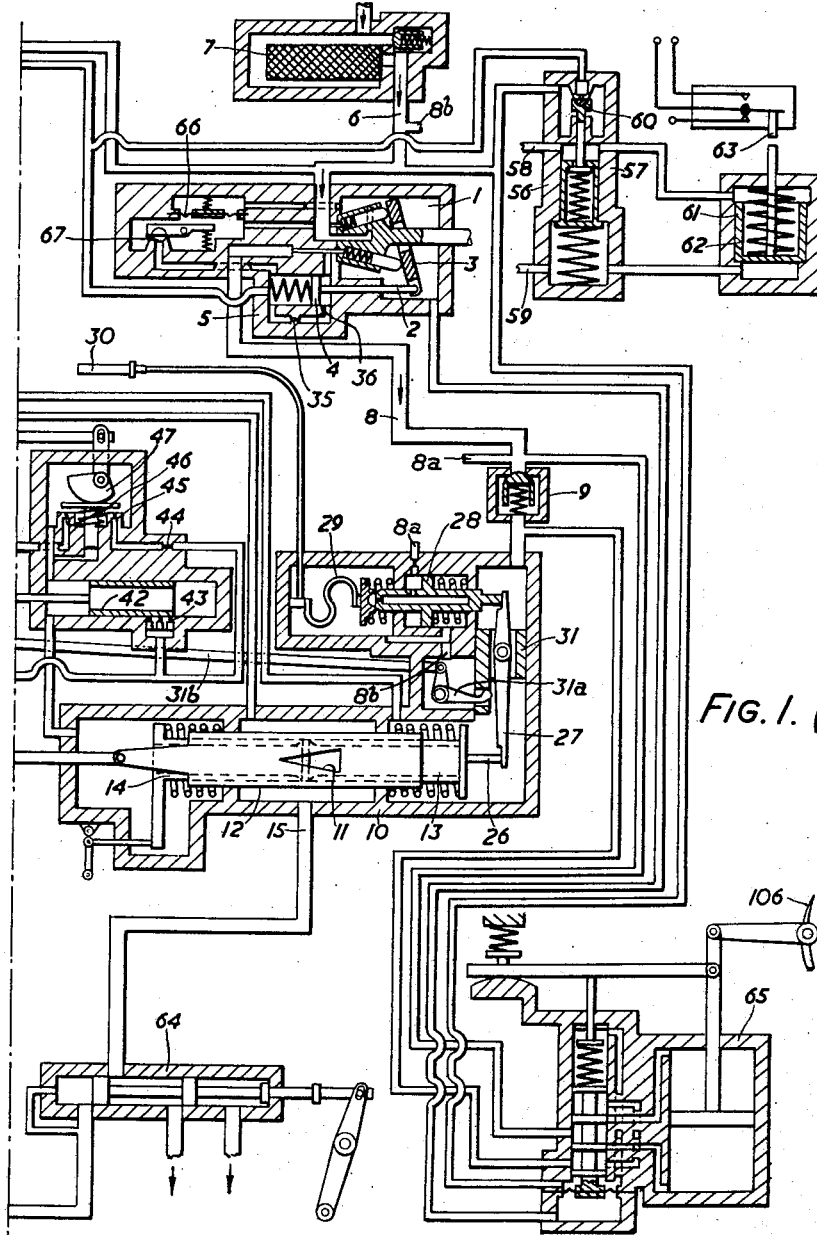
FIGURE 2 is a diagrammatic view of a power unit to which the apparatus may be applied.
Figure 2:
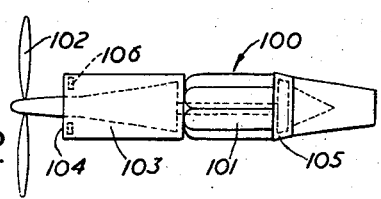

The apparatus shown in FIGURE 1 comprises a variable delivery fuel pump 1 of known type arranged to be driven by the power unit 100 (see FIGURE 2) and to have its delivery controlled by a rod 2 acting on the tilting plate 3 of the pump and connected to the piston 4 of a hydraulic servo device 5 in a manner well known per se.

The pump 1 draws fuel through an inlet passage 6 in which a filter 7 is disposed and delivers it to a delivery passage 8 and hence through a pressure maintaining valve 9 onto the casing of a metering device 10. The metering orifice 11 of this device 10 is formed by the cooperation of a tapering slot in an outer sleeve 12 with the adjacent ends of inner sleeves 13 and 14. The fuel, which passes from the interior of the casing into the interior of the sleeve 13 and thence out through the gap formed between the ends of the sleeves 13 and 14 and the edges of the slot 11, passes through a pipe 15 to the burners of the combustion chambers 101 of the power unit 100.

The main metering orifice member or outer sleeve 12 of the metering device is moved to vary the fuel flow to the power unit by a rod 16 connected through an arm 17 of a lever 18 which constitutes the main control member of the apparatus. The control of a governor 22 which controls the pitch of a variable pitch propeller 102 by which the speed of the power unit 100 is controlled, is also effected from the main control lever 18 through the rod 16 by means of a fuel operated servo device the valve 19 of which is connected to the rod 16 as shown, while its piston 20 is connected by a rod 21 to the propeller pitch governor 22. The rod 21 also acts on a feed-back linkage comprising a lever 23, a rod 24 and a ported sleeve 25 in which valve 19 operates, so that the piston 20 is caused always to move into, or be maintained in, a position corresponding to the position of the valve 19 and hence of the main control member 18.

The subsidiary metering orifice member or inner sleeve 13 is controlled according to variations from a datum value of the temperature at the inlet 104 of the compressor 103, modified in a predetermined manner according to the speed of the power unit. The sleeve 13 is connected through a rod 26, and a pivoted lever 27 having a movable fulcrum, to a fuel operated follow up servo device 28 the control valve of which is operated by a temperature responsive device 29 having its bulb 30 situated in the inlet of the compressor 103, the arrangement being such that movement of the sleeve 13 will vary the fuel passing through the metering orifice 11 irrespective of the setting of the sleeve 12. The control of the sleeve 13 by the temperature responsive device is modified by alteration of the position of the fulcrum of the pivoted lever 27 according to the speed of the power unit. The lever 27 is pivoted to a slide 31 the position of which is varied by a bell crank lever 31a connected through a link 31b to another bell crank lever 31c operated by a cam 31d on the rod 21 which operates the governor control apparatus. Variations in speed of the power unit will thus vary the relationship between movements of the follow-up servo device 28 and of the sleeve 13 according to a law determined by the shape of the cam 31d.

Also incorporated in the metering device is the other inner sleeve 14 (mentioned above) by which the datum setting of the metering orifice 11, that is to say its effective opening for any given positions of the sleeves 12 and 13, can be altered when necessary, for instance when air is being tapped off from the compressor 103 for aircraft cabin pressurizing purposes.

Associated with the metering device 10 is a metering pressure control unit comprising a diaphragm 32 the opposite faces of which are subject to the pressures respectively on the two sides of the metering orifice 11, which diaphragm acts through a rod 33 in known manner on a relief valve device 34 controlling a relief port by which fuel which flows through a restrictor orifice 35 from the right hand end into the left hand end of the cylinder 36 in the fuel pump in which the piston 4 operates can escape. The position of the piston 4 can thus be controlled in known manner to vary the delivery of the pump 1 in such manner as to maintain a desired pressure drop across the metering orifice 11.

The rod 33 is acted upon by a spring 33a which determines the value of the pressure drop maintained, by the operation of the diaphragm 32 and the valve 34, across the metering orifice 11, the spring 33a having an abutment 33b which is controlled to vary the setting of the spring and hence the pressure drop across the metering orifice 11 by means of a servo device comprising a servo piston 37 acting through a variable fulcrum lever 38 on the abutment 33b and controlled by a servo valve 39 actuated by a bellows type aneroid device 40 which is subject through a pipe 40a to compressor inlet pressure, that is to say to the pressure in the air inlet 104 of the compressor 103. Thus the device 40 acts through the servo device 39, 37 and the lever 38 to control the pressure drop across the metering orifice 11 in accordance with the compressor inlet pressure. In the form of apparatus being described, the pressure drop maintained across the metering orifice 11 is proportional to the square of the compressor inlet pressure and fuel flow through the metering orifice 11 is thus controlled linearly with compressor inlet pressure. The fulcrum of the lever 38 may be adjustable so that linearity may be departed from if and when engine characteristics so require.

In addition acceleration and deceleration controls are provided. Since the rate of increase of power output with increases in speed of the power unit on the normal operating curve is greater than the rate of increase of power absorption with increases in speed of a fixed pitch propeller, any increase in engine speed must call for a coarsening of the propeller pitch to absorb the disproportionate increase in power at the fuel setting corresponding to the higher speed. The first effect on the governor 22 of a movement of the main control member 18 to increase the speed of the power unit would however normally be to cause the governor to reduce the pitch of the propeller 102. Conversely, when the main control member 18 is moved to reduce the speed the first effect on the governor 22 would be to cause it to coarsen the propeller pitch whereas what is eventually required is a reduction in pitch to allow for the disproportionate decrease in power. Therefore, a delayed action servo mechanism is provided to control the rate of adjustment of the governor 22 when movements of the main control member 18 occur, in such a manner that the adjustment of the governor 22 on any movement of the main control member 18 lags behind the adjustment of the fuel supply sufficiently to ensure against initial adjustment of the propeller pitch in the wrong direction. Thus the rate of movement of the control rod 21 on any change of position of the main control lever 18 is controlled by an acceleration control device comprising a lever 41 connected to the rod 21 and to a sleeve valve device 42 controlling a series of ports 43.

During acceleration of the power unit, exhaust servo operating fluid flows from the right hand end of the valve chamber of the governor servo through the ports 43 as they are progressively uncovered by sleeve 42 with increasing r.p.m. The right hand end of said valve chamber is also connected to a fixed orifice 44 and a variably controlled restriction 45 in series with one another and in parallel with ports 43.

During deceleration the space at the left hand end of said valve chamber is connected to a controlled restriction 46.

Both controlled restrictions 45 and 46 are controlled by a flap operated by a cam 47 arranged to be operatively dependant upon the compressor inlet pressure sensitive device 33.

It will be seen therefore that during acceleration the rate of movement of the governor servo piston 20 is determined jointly by the speed range over which it is moving, which affects the number of ports 43 which are uncovered, and the compressor inlet pressure acting on the device 40 which affects the degree of opening of restriction 45 and thus the rate of flow through it. On deceleration the rate of movement of the piston is determined solely by the compressor inlet pressure acting on the device 40. An over-ride device 48 is provided by which the pilot can adjust the propeller governor 22 to obtain an increased speed independently of operation of main control lever 18.

Associated with the main control lever 18 and the governor control rod 21 is a temperature control device comprising a temperature responsive member 49 arranged to be responsive to the temperature at the inlet of the turbine 105 and acting on an intermediate point in a floating lever 50, one end of which controls the valve 51a by which the control system of the pump 1 is influenced in known manner so that, when the valve 51a is opened, the delivery of the pump is reduced, while the other end of the lever 50 is connected to a rod 51 acted upon in one direction by a spring 52 and in the other direction by a lever 53 at the point at which the rod 51 is pivoted. The ends of the lever 53 are acted upon by cams 54 and 55 arranged to be operated respectively by the levers 17 and 23. The cams 54 and 55 are formed so that on acceleration or deceleration they act in opposite senses through the lever 53 on the rod 51, the arrangement being such that, when the main control lever 18 is moved to effect acceleration, the immediate result is to influence the temperature control device 49 so that it would, if this condition persisted, permit an excessive temperature. The subsequent movement of the cam 55, however, as the governor control servo piston 20 moves the governor control rod 21 into the new position, brings the temperature control device 49 to a setting at which it will reduce fuel supply only if the maximum permissible turbine inlet temperature appropriate to the new setting of the main control lever 18 is exceeded.

The arrangement and operation of the temperature-responsive device 29, 30 and of the pressure-responsive device 40 are such as normally to maintain the inlet temperature of the turbine 105 constant for any given setting of the speed of the power unit by the main control lever 18. The action of the temperature responsive device 49 is on the other hand only to limit the turbine inlet temperature if, owing to some mal-adjustment or failure of some part to operate satisfactorily or sufficiently rapidly the turbine inlet temperature should tend to rise above some safe maximum. The device 49 may therefore be regarded as a safety device.

Incorporated in the pump 1 is a speed responsive device which is arranged to reduce the fuel supply automatically if the power unit overspeeds. Fuel from the chamber in which the rotating parts of the pump rotate is bled from the chamber to one side of a spring loaded diaphragm 66 and fuel from the inlet passage 6 to the other side of this diaphragm. The diaphragm is arranged to act upon a valve device 67 which allows liquid to escape from the left hand end of the cylinder 36 in which the piston 4 operates. If the pressure built up in the pump chamber becomes excessive, indicating that the pump speed is above a certain value, and the power unit is therefore overspeeding, the increase in pressure acts upon the diaphragm causing it to open valve device 67 to cause a drop in pressure in the fluid in the left hand end of the cylinder 36 and thus allow the piston 4 to move to the left causing the capacity of the pump to be reduced and thus reduce the fuel supply to the power unit.

The apparatus also incorporates means for reducing or shutting off fuel if a predetermined maximum torque in the propeller shaft is exceeded, this apparatus including hydraulic torque-responsive mechanism, which may be for example as described in the specification of the present applicant's United States Patent No. 2,715,834, and a pressure responsive device arranged to be responsive to a pressure or pressures derived from the hydraulic torque-responsive apparatus and to reduce or shut off the fuel supply from the pump 1 if a predetermined torque is exceeded. Such a torque-limiting device is shown diagrammatically at 56 and may comprise a pressure-responsive member 57 subject to differential pressures derived from the torque responsive apparatus and acting through pipes 58, 59, and a valve 60 controlled by the pressure responsive member 57 and serving in known manner to influence the delivery of the pump 1.

In addition a device, also responsive to pressure or pressures derived from the hydraulic torque responsive apparatus, may be provided whereby, on the occurrence of a negative torque or a predetermined low positive torque in the propeller shaft, feathering or positive pitch coarsening of the propeller is brought into operation, a form of such a device being diagrammatically shown at 61 and comprising a piston member 62 subject to the differential pressures exerted through the pipes 58, 59 and arranged to actuate a switch 63 of electrical feathering apparatus on the occurrence of a pressure relationship in the pipes 58, 59 such as results from negative torque or a predetermined low value of positive torque in the propeller shaft. The torque responsive apparatus above referred to may be arranged to operate as described in the specification of the present applicant's United States patent application Serial No. 487,661, filed February 11, 1955.

A dump valve as indicated at 64, by which fuel can be shut off from the burners of combustion chambers 101 and the fuel in the pipes leading to the burners discharged to atmosphere, may also be provided.

The compressor 103 includes inlet guide vanes 106 which are adjustable so that their setting can be varied at low speeds to enable larger quantities of fuel to be delivered than could be delivered without surge occurring in the compressor with the guide vanes in their normal datum position. These guide vanes are arranged to be responsive to the speed of the power unit so that they automatically move towards and into their datum position as the speed rises. For this purpose a hydraulic servo device indicated at 65 is provided which is responsive to a differential pressure produced in the pump 1 by its rotating parts and hence to the speed of the power unit.

The hydraulic servo devices 28, 37—39, 19—20 and 65 derive their working liquid from the upstream side of the pressure-maintaining valve 9 via a supply line indicated generally by reference numeral 8a, and servo device 28 exhausts to inlet passage 6 by return passage 8b.

What we claim as our invention and desire to secure by Letters Patent is:

Apparatus for metering the fuel supplied to a propulsion unit comprising an air compressor, at least one combustion chamber, a turbine, a variable pitch propeller, and driving connections from said turbine to said air compressor and to said propeller, said apparatus comprising a governor to control the pitch of said propeller and maintain the speed of said turbine approximately constant at any setting of said governor, a main fuel passage, a fuel metering device including a metering orifice in said main fuel passage whereby fuel supplied to said combustion chamber is metered, a main metering orifice control member which controls the effective cross section of said metering orifice and a subsidiary metering orifice control member which modifies the effective cross section of said metering orifice as set by said main metering orifice control member, a pump to deliver fuel through said main fuel passage and said metering orifice, a metering pressure control unit which controls the pressure drop across said metering orifice, a main control member, operative connections between said main control member and said governor and between said main control member and said main metering orifice control member, a temperature responsive member sensitive to deviations of compressor inlet temperature from a datum, an operative connection between said temperature responsive member and said subsidiary metering orifice control member, said last-mentioned operative connection including a variable connecting device, and means for varying the setting of said variable connecting device in accordance with a function of a variable operating condition of said power unit; in combination with delayed action servo mechanism in said operative connection between said main control member and said governor so arranged that on movement of said main control member the resulting adjustment of said governor lags behind the adjustment of the fuel supply, said delayed action servo mechanism comprising independent delayed action controls respectively for conditions when said main control member is moved to increase the speed setting of said governor and when said main control member is moved to decrease the speed setting of said governor, said controls being independent of the rate of movement of said main control member, and at least one hydraulic servo device, a pressure-maintaining valve disposed in said fuel passage between said pump and said metering orifice, said pressure-maintaining valve to maintain a pressure drop across, suitable for operation of said servo device, conduit means for supplying fuel as operating medium for said servo device connected to said fuel passage on the upstream side of said pressure-maintaining valve, and conduit means for returning exhaust operating medium from said servo device connected to said fuel passage on the downstream side of said pressure-maintaining valve.

References Cited in the file of this patent
UNITED STATES PATENTS

| | | |
|---|---|---|
| 2,593,536 | Chamberlin et al. | Apr. 22, 1952 |
| 2,645,293 | Ogle et al. | July 14, 1953 |
| 2,708,826 | Torell | May 24, 1955 |
| 2,732,019 | Stebbins | Jan. 24, 1956 |
| 2,801,701 | Coar | Aug. 6, 1957 |
| 2,802,335 | Skellern | Aug. 13, 1957 |
| 2,836,957 | Fox | June 3, 1958 |
| 2,856,754 | Torell | Oct. 21, 1958 |